(12) United States Patent
Lee

(10) Patent No.: US 8,736,178 B2
(45) Date of Patent: May 27, 2014

(54) LED LIGHTING APPARATUS EQUIPPED WITH HIGH-EFFICIENCY POWER SUPPLY

(76) Inventor: Dong-Won Lee, Suwon (KR)

( * ) Notice: Subject to any disclaimer, the term of this patent is extended or adjusted under 35 U.S.C. 154(b) by 147 days.

(21) Appl. No.: 13/314,746

(22) Filed: Dec. 8, 2011

(65) Prior Publication Data

US 2012/0176037 A1     Jul. 12, 2012

(30) Foreign Application Priority Data

Jan. 10, 2011  (KR) .................. 10-2011-0002075
May 25, 2011  (KR) .................. 10-2011-0049443

(51) Int. Cl.
*H05B 37/02*     (2006.01)

(52) U.S. Cl.
USPC .................... 315/122; 315/151; 315/291

(58) Field of Classification Search
USPC ................................................ 315/121, 122
See application file for complete search history.

(56) References Cited

U.S. PATENT DOCUMENTS

| | | | | |
|---|---|---|---|---|
| 7,233,258 | B1 * | 6/2007 | Gelinas ...................... | 340/907 |
| 7,339,323 | B2 * | 3/2008 | Bucur ......................... | 315/128 |
| 7,830,097 | B2 * | 11/2010 | Kunimatsu ................. | 315/291 |
| 8,324,816 | B2 * | 12/2012 | Ohashi et al. .............. | 315/127 |
| 2010/0060204 | A1 * | 3/2010 | Ohtake et al. .............. | 315/307 |
| 2012/0020134 | A1 * | 1/2012 | Lee et al. ................... | 363/126 |
| 2013/0147358 | A1 * | 6/2013 | Kotowski et al. .......... | 315/122 |

FOREIGN PATENT DOCUMENTS

| | | |
|---|---|---|
| JP | 10-257767 | 9/1998 |
| JP | 2005-032260 | 2/2005 |
| KR | 100942234 | 2/2010 |

* cited by examiner

*Primary Examiner* — Alexander H Taningco
*Assistant Examiner* — Nelson Correa
(74) *Attorney, Agent, or Firm* — IPLA P.A.; James E. Bame

(57) ABSTRACT

Disclosed is an LED lighting apparatus equipped with a high-efficiency power supply, capable of representing high power efficiency even in a low-power LED lighting apparatus by recycling a surplus voltage to charge a condenser, which supplies power to the controller, with the surplus voltage if the surplus voltage is generated from an LED acting as a load after a rectified voltage supplied to the LED has been consumed in the LED according to a design value.

5 Claims, 10 Drawing Sheets

FIG. 5

| Current | M1 | M2 | M3 | M4 | M5 | M6 | M7 | M8 | M9 | M10 | M11 |
|---|---|---|---|---|---|---|---|---|---|---|---|
| 0.0 | 13.12 | 26.24 | 39.35 | 52.47 | 65.59 | 78.71 | 91.83 | 104.95 | 118.06 | 131.18 | 144.30 |
| 1.0 | 14.01 | 28.02 | 42.03 | 56.04 | 70.05 | 84.07 | 98.08 | 112.09 | 126.10 | 140.11 | 154.12 |
| 2.0 | 14.58 | 29.16 | 43.74 | 58.32 | 72.90 | 87.48 | 102.06 | 116.64 | 131.22 | 145.80 | 160.38 |
| 3.0 | 15.18 | 30.36 | 45.54 | 60.71 | 75.89 | 91.07 | 106.25 | 121.43 | 136.61 | 151.79 | 166.96 |
| 4.0 | 15.63 | 31.25 | 46.88 | 62.50 | 78.13 | 93.75 | 109.38 | 125.00 | 140.63 | 156.25 | 171.88 |
| 5.0 | 16.14 | 32.28 | 48.42 | 64.56 | 80.70 | 96.84 | 112.98 | 129.12 | 145.26 | 161.40 | 177.54 |
| 6.0 | 16.62 | 33.24 | 49.86 | 66.48 | 83.10 | 99.73 | 116.35 | 132.97 | 149.59 | 166.21 | 182.83 |
| 7.0 | 17.07 | 34.13 | 51.20 | 68.27 | 85.34 | 102.40 | 119.47 | 136.54 | 153.61 | 170.67 | 187.74 |
| 8.0 | 17.45 | 34.89 | 52.34 | 69.78 | 87.23 | 104.67 | 122.12 | 139.56 | 157.01 | 174.45 | 191.90 |
| 9.0 | 17.89 | 35.78 | 53.67 | 71.57 | 89.46 | 107.35 | 125.24 | 143.13 | 161.02 | 178.91 | 196.81 |
| 10.0 | 18.27 | 36.54 | 54.81 | 73.08 | 91.35 | 109.62 | 127.88 | 146.15 | 164.42 | 182.69 | 200.96 |
| 11.0 | 18.68 | 37.36 | 56.04 | 74.73 | 93.41 | 112.09 | 130.77 | 149.45 | 168.13 | 186.81 | 205.49 |
| 12.0 | 19.06 | 38.12 | 57.18 | 76.24 | 95.30 | 114.35 | 133.41 | 152.47 | 171.53 | 190.59 | 209.65 |
| 13.0 | 19.47 | 38.94 | 58.41 | 77.88 | 97.36 | 116.83 | 136.30 | 155.77 | 175.24 | 194.71 | 214.18 |
| 14.0 | 19.81 | 39.63 | 59.44 | 79.26 | 99.07 | 118.89 | 138.70 | 158.52 | 178.33 | 198.15 | 217.96 |
| 15.0 | 20.16 | 40.32 | 60.47 | 80.63 | 100.79 | 120.95 | 141.11 | 161.26 | 181.42 | 201.58 | 221.74 |
| 16.0 | 20.54 | 41.07 | 61.61 | 82.14 | 102.68 | 123.21 | 143.75 | 164.29 | 184.82 | 205.36 | 225.89 |
| 17.0 | 20.91 | 41.83 | 62.74 | 83.65 | 104.57 | 125.48 | 146.39 | 167.31 | 188.22 | 209.13 | 230.05 |
| 18.0 | 21.26 | 42.51 | 63.77 | 85.03 | 106.28 | 127.54 | 148.80 | 170.05 | 191.31 | 212.57 | 233.83 |
| 19.0 | 21.63 | 43.27 | 64.90 | 86.54 | 108.17 | 129.81 | 151.44 | 173.08 | 194.71 | 216.35 | 237.98 |
| 20.0 | 21.94 | 43.89 | 65.83 | 87.77 | 109.72 | 131.66 | 153.61 | 175.55 | 197.49 | 219.44 | 241.38 |
| 21.0 | 22.32 | 44.64 | 66.96 | 89.29 | 111.61 | 133.93 | 156.25 | 178.57 | 200.89 | 223.21 | 245.54 |
| 22.0 | 22.66 | 45.33 | 67.99 | 90.66 | 113.32 | 135.99 | 158.65 | 181.32 | 203.98 | 226.65 | 249.31 |
| 23.0 | 23.01 | 46.02 | 69.02 | 92.03 | 115.04 | 138.05 | 161.06 | 184.07 | 207.07 | 230.08 | 253.09 |
| 24.0 | 23.35 | 46.70 | 70.05 | 93.41 | 116.76 | 140.11 | 163.46 | 186.81 | 210.16 | 233.52 | 256.87 |
| 25.0 | 23.66 | 47.32 | 70.98 | 94.64 | 118.30 | 141.96 | 165.63 | 189.29 | 212.95 | 236.61 | 260.27 |
| 26.0 | 24.00 | 48.01 | 72.01 | 96.02 | 120.02 | 144.02 | 168.03 | 192.03 | 216.04 | 240.04 | 264.05 |
| 27.0 | 24.35 | 48.70 | 73.04 | 97.39 | 121.74 | 146.09 | 170.43 | 194.78 | 219.13 | 243.48 | 267.82 |
| 28.0 | 24.69 | 49.38 | 74.07 | 98.76 | 123.45 | 148.15 | 172.84 | 197.53 | 222.22 | 246.91 | 271.60 |
| 29.0 | 25.03 | 50.07 | 75.10 | 100.14 | 125.17 | 150.21 | 175.24 | 200.27 | 225.31 | 250.34 | 275.38 |
| 30.0 | 25.31 | 50.62 | 75.93 | 101.24 | 126.55 | 151.85 | 177.16 | 202.47 | 227.78 | 253.09 | 278.40 |

FIG. 7

| Current | Ang1 | Ang2 | Ang3 | Ang4 | Ang5 | Ang6 | Ang7 | Ang8 | Ang9 | Ang10 | Ang11 |
|---|---|---|---|---|---|---|---|---|---|---|---|
| 0.0 | 3.4 | 6.8 | 10.3 | 13.8 | 17.3 | 21.0 | 24.7 | 28.5 | 32.5 | 36.6 | 41.0 |
| 1.0 | 3.7 | 7.3 | 11.0 | 14.8 | 18.6 | 22.5 | 26.5 | 30.6 | 35.0 | 39.6 | 44.5 |
| 2.0 | 3.8 | 7.6 | 11.5 | 15.4 | 19.4 | 23.4 | 27.6 | 32.0 | 36.6 | 41.5 | 46.8 |
| 3.0 | 4.0 | 7.9 | 11.9 | 16.0 | 20.2 | 24.5 | 28.9 | 33.5 | 38.4 | 43.6 | 49.4 |
| 4.0 | 4.1 | 8.2 | 12.3 | 16.5 | 20.8 | 25.2 | 29.8 | 34.6 | 39.7 | 45.3 | 51.4 |
| 5.0 | 4.2 | 8.4 | 12.7 | 17.1 | 21.5 | 26.1 | 30.9 | 35.9 | 41.3 | 47.2 | 53.8 |
| 6.0 | 4.3 | 8.7 | 13.1 | 17.6 | 22.2 | 27.0 | 31.9 | 37.2 | 42.8 | 49.1 | 56.2 |
| 7.0 | 4.4 | 8.9 | 13.5 | 18.1 | 22.8 | 27.7 | 32.9 | 38.4 | 44.3 | 50.9 | 58.6 |
| 8.0 | 4.5 | 9.1 | 13.8 | 18.5 | 23.4 | 28.4 | 33.7 | 39.4 | 45.5 | 52.5 | 60.7 |
| 9.0 | 4.7 | 9.4 | 14.1 | 19.0 | 24.0 | 29.2 | 34.7 | 40.6 | 47.0 | 54.4 | 63.5 |
| 10.0 | 4.8 | 9.6 | 14.4 | 19.4 | 24.5 | 29.9 | 35.5 | 41.6 | 48.4 | 56.1 | 66.0 |
| 11.0 | 4.9 | 9.8 | 14.8 | 19.9 | 25.1 | 30.6 | 36.5 | 42.8 | 49.8 | 58.1 | 69.1 |
| 12.0 | 5.0 | 10.0 | 15.1 | 20.3 | 25.7 | 31.3 | 37.3 | 43.9 | 51.2 | 60.0 | 72.4 |
| 13.0 | 5.1 | 10.2 | 15.4 | 20.7 | 26.3 | 32.1 | 38.3 | 45.1 | 52.8 | 62.3 | 76.8 |
| 14.0 | | | | | | 32.7 | 39.1 | 46.1 | 54.2 | 64.2 | 82.2 |
| 15.0 | | | | | | 33.4 | 39.9 | 47.1 | 55.6 | 66.4 | |
| 16.0 | | | | | | 34.1 | 40.8 | 48.3 | 57.2 | 69.0 | |
| 17.0 | | | | | | 34.8 | 41.7 | 49.5 | 58.8 | 71.9 | |
| 18.0 | | | | | | 35.4 | 42.6 | 50.6 | 60.4 | 75.1 | |
| 19.0 | | | | | | 36.2 | 43.5 | 51.9 | 62.3 | 79.5 | |
| 20.0 | | | | | | 36.8 | 44.3 | 52.9 | 63.9 | 85.9 | |
| 21.0 | | | | | | 37.5 | 45.3 | 54.3 | 65.9 | | |
| 22.0 | | | | | | 38.2 | 46.1 | 55.5 | 68.0 | | |
| 23.0 | | @ 220V | | | | | | | | | |
| 24.0 | | | | | | | | | | | |
| 25.0 | | | | | | | | | | | |

FIG. 9

| Angle | Vin 220 | Isin 20 | Vcs | Angle | Vin 220 | Isin 20 | Vcs |
|---|---|---|---|---|---|---|---|
| 0 | 0.0 | 0.00 | 0.0 | 46 | 158.3 | 14.39 | 17.1 |
| 1 | 3.8 | 0.35 | 0.0 | 47 | 160.9 | 14.63 | 0.0 |
| 2 | 7.7 | 0.70 | 0.0 | 48 | 163.5 | 14.86 | 2.2 |
| 3 | 11.5 | 1.05 | 0.0 | 49 | 166.0 | 15.09 | 1.8 |
| 4 | 15.3 | 1.40 | 0.8 | 50 | 168.5 | 15.32 | 4.2 |
| 5 | 19.2 | 1.74 | 4.6 | 51 | 171.0 | 15.54 | 6.7 |
| 6 | 23.0 | 2.09 | 7.8 | 52 | 173.4 | 15.76 | 9.1 |
| 7 | 26.8 | 2.44 | 11.6 M1 | 53 | 175.7 | 15.97 | 11.4 |
| 8 | 30.6 | 2.78 | 0.3 | 54 | 178.0 | 16.18 | 10.7 |
| 9 | 34.4 | 3.13 | 3.2 | 55 | 180.2 | 16.38 | 12.9 |
| 10 | 38.2 | 3.47 | 7.0 | 56 | 182.4 | 16.58 | 15.1 |
| 11 | 42.0 | 3.82 | 10.7 | 57 | 184.5 | 16.77 | 17.2 M8 |
| 12 | 45.7 | 4.16 | 13.5 M2 | 58 | 186.6 | 16.96 | 0.0 |
| 13 | 49.5 | 4.50 | 1.1 | 59 | 188.6 | 17.14 | 0.0 |
| 14 | 53.2 | 4.84 | 4.8 | 60 | 190.5 | 17.32 | 0.0 |
| 15 | 56.9 | 5.18 | 7.1 | 61 | 192.4 | 17.49 | 1.1 |
| 16 | 60.6 | 5.51 | 10.8 | 62 | 194.2 | 17.66 | 2.9 |
| 17 | 64.3 | 5.85 | 14.5 M3 | 63 | 196.0 | 17.82 | 4.7 |
| 18 | 68.0 | 6.18 | 0.0 | 64 | 197.7 | 17.98 | 6.4 |
| 19 | 71.6 | 6.51 | 3.4 | 65 | 199.4 | 18.13 | 4.7 |
| 20 | 75.2 | 6.84 | 7.0 | 66 | 201.0 | 18.27 | 6.3 |
| 21 | 78.8 | 7.17 | 9.1 | 67 | 202.5 | 18.41 | 7.8 |
| 22 | 82.4 | 7.49 | 12.6 M4 | 68 | 204.0 | 18.54 | 9.3 |
| 23 | 86.0 | 7.81 | 0.0 | 69 | 205.4 | 18.67 | 10.7 |
| 24 | 89.5 | 8.13 | 0.0 | 70 | 206.7 | 18.79 | 12.0 |
| 25 | 93.0 | 8.45 | 3.5 | 71 | 208.0 | 18.91 | 13.3 |
| 26 | 96.4 | 8.77 | 7.0 | 72 | 209.2 | 19.02 | 11.7 |
| 27 | 99.9 | 9.08 | 8.5 | 73 | 210.4 | 19.13 | 12.9 |
| 28 | 103.3 | 9.39 | 11.9 | 74 | 211.5 | 19.23 | 14.0 |
| 29 | 106.7 | 9.70 | 15.3 M5 | 75 | 212.5 | 19.32 | 15.0 |
| 30 | 110.0 | 10.00 | 0.4 | 76 | 213.5 | 19.41 | 16.0 |
| 31 | 113.3 | 10.30 | 1.2 | 77 | 214.4 | 19.49 | 16.9 |
| 32 | 116.6 | 10.60 | 4.5 | 78 | 215.2 | 19.56 | 17.7 |
| 33 | 119.8 | 10.89 | 7.7 | 79 | 216.0 | 19.63 | 18.5 M9 |
| 34 | 123.0 | 11.18 | 8.7 | 80 | 216.7 | 19.70 | 0.0 |
| 35 | 126.2 | 11.47 | 11.8 | 81 | 217.3 | 19.75 | 0.0 |
| 36 | 129.3 | 11.76 | 15.0 | 82 | 217.9 | 19.81 | 0.0 |
| 37 | 132.4 | 12.04 | 15.6 M6 | 83 | 218.4 | 19.85 | 0.0 |
| 38 | 135.4 | 12.31 | 0.0 | 84 | 218.8 | 19.89 | 0.0 |
| 39 | 138.5 | 12.59 | 2.2 | 85 | 219.2 | 19.92 | 0.0 |
| 40 | 141.4 | 12.86 | 5.1 | 86 | 219.5 | 19.95 | 0.0 |
| 41 | 144.3 | 13.12 | 5.6 | 87 | 219.7 | 19.97 | 0.3 |
| 42 | 147.2 | 13.38 | 8.5 | 88 | 219.9 | 19.99 | 0.4 |
| 43 | 150.0 | 13.64 | 11.3 | 89 | 220.0 | 20.00 | 0.5 |
| 44 | 152.8 | 13.89 | 14.1 M7 | 90 | 220.0 | 20.00 | 0.6 M10 |
| 45 | 155.6 | 14.14 | 14.5 | | | | |

LED LIGHTING APPARATUS EQUIPPED WITH HIGH-EFFICIENCY POWER SUPPLY

CROSS REFERENCES

Applicant claims foreign priority under Paris Convention to Korean Patent Application Nos. 10-2011-0002075 filed 10 Jan. 2011, and 10-2011-0049443 filed 25 May 2011, with the Korean Intellectual Property Office, where the entire contents are incorporated herein by reference.

BACKGROUND OF THE INVENTION

1. Field of the Invention

The present invention relates to an LED lighting apparatus equipped with a high-efficiency power supply. In more particular, the present invention relates to an LED lighting apparatus equipped with a high-efficiency power supply, capable of representing high power efficiency even in a low-power LED lighting apparatus by recycling a surplus voltage to charge a condenser, which supplies power to the controller, with the surplus voltage if the surplus voltage is generated from an LED acting as a load after a rectified voltage supplied to the LED has been consumed in the LED according to a design value.

2. Description of the Related Art

An LED (light emitting diode) is an electrical/optical conversion semiconductor device to emit a light as electricity is applied thereto, and extensively used for a backlight of a display. In addition, since the electrical/optical conversion efficiency of the LED is more increased with the advance of technologies as compared with existing light bulbs and existing fluorescent lamps, the LED has been extensively used as general lighting devices. However, in the LED, since a current greatly varies even if a voltage slightly varies, the current must be accurately controlled.

As shown in FIG. 1, an LED lighting apparatus according to the related art includes an AC voltage source 910 to supply an AC voltage, a rectifier 940 to convert the AC voltage received from the AC voltage source 910 into a DC rectified voltage Vrect, first to third LED blocks 971 to 973 that act as loads and are driven by the rectified voltage, which is an output of the rectifier 940, a switch block including first to third by-pass switches SW11 to SW13 arranged in series to by-pass the currents of the LED blocks, a current source CS9 to restrict the current of the load, a controller 904 to control the switch block and a current source, a power supplying condenser C9 to supply a DC power to the controller 904, and a resistor R9, a diode D9, and a zener diode ZD9 for overvoltage protection that constitute a charging circuit to charge the power supplying condenser C9.

Accordingly, if the AC voltage source 910 starts to supply a commercial voltage, the power supplying condenser C9, which supplies a DC power to the controller, is charged with the voltage by the charging circuit, and the controller 904 controls the switch block so that LED blocks suitable for the instantaneous rectified voltage Vrect are arranged in series, and restricts an amount of a current flowing through the loads by controlling the current source.

Hereinafter, the charging circuit will be described in more detail. If the rectifier 940 starts to supply the rectified voltage Vrect, a current, which has passed through the resistor R9 and the diode D9 connected to each other in series, starts to be charged in the condenser C9 for supply DC power. Then, if the condenser C9 is charged with the current, so that a voltage Vcc across both terminals of the condenser C9 exceeds the minimum voltage (for example, DC 5V) to operate the controller 904, the controller 904 commences the operation thereof.

Meanwhile, if the DC power supplying condenser C9 is excessively charged, so that the voltage Vcc across both terminals of the DC power supplying condenser C9 reaches the maximum operating voltage (for example, DC 28V) to operate the controller 904, the zener diode ZD9 for overvoltage protection is operated to prevent the voltage of the condenser C9 from being charged up. In addition, if the rectified voltage Vrect is dropped to the voltage Vcc across both terminals of the DC power supplying condenser C9 or less, the diode D9 prevents the DC power supplying condenser C9 from being discharged through the resistor R9.

Hereinafter, the problems caused in the related art will be described.

First, the AC voltage source 910 supplies a commercial voltage of 220 Vrms. On the assumption that the maximum operating voltage of the controller 904 is DC 28V (i.e., 20 Vrms), and the current required for the controller 904 is 1 mA, the power consumed in the resistor R9 becomes 200 mW obtained by 200 Vrms×1 mA.

Accordingly, when high power is required, for example, when a 20 watt LED lamp is driven, about 1% of power is used to generate the driving power of the controller 904. In addition, when low power is required, for example, when a 4.4 watt LED lamp (220V×20 mA) is driven, about 4.5% of power is used to generate the driving power of the controller, so that power efficiency is lowered. Accordingly, the improvement is required to increase power efficiency in the low-power LED lighting apparatus.

SUMMARY OF THE INVENTION

Accordingly, the present invention has been made keeping in mind the above problems occurring in the prior art, and an object of the present invention is to provide an LED lighting apparatus equipped with a high-efficiency power supply, capable of representing high power efficiency even in a low-power LED lighting apparatus by recycling a surplus voltage to charge a condenser, which supplies power to the controller, with the surplus voltage if the surplus voltage is generated from an LED acting as a load after a rectified voltage supplied to the LED from the rectifier has been consumed in the LED according to a design value.

In order to accomplish the object, there is provided an LED lighting apparatus including a rectifier to rectify an AC voltage so that the AC voltage is converted into a DC rectified voltage, a load including a plurality of LED blocks connected to each other in series, a switch block including switches to by-pass currents flowing through the LED blocks, a current source to adjust a current supplied to the LED block, a controller to calculate a design current value based on the AC voltage, regulate current flow of the load by controlling the switch block according to the design current value, and restrict an amount of currents flowing through the load by controlling the current source according to the design current value, a power supplying condenser to supply charged power to the controller, a starting circuit to charge the condenser if the rectifier starts to supply power, and a load current recycling circuit to charge the condenser with a surplus voltage in such a manner that the controller is operated based on the surplus voltage remaining after the load uses the rectified voltage supplied thereto from the rectifier through a control of the controller for the switch block and the current source according to the design current value.

In this case, the controller calculates the design current value as a sinusoidal wave by using a sinusoidal signal having a phase identical to a phase of the AC voltage.

In addition, the controller controls the current source so that a step waveform current is supplied to the load based on a phase of one of an instantaneous rectified voltage and a rectified voltage.

In addition, the switches of the switch block, which by-pass currents flowing through the LED blocks, are connected to each other in series or in parallel.

In addition, the load current recycling circuit includes a load-side diode connected in series between the power supplying condenser and the load and a load-side switch connected between an anode of the load-side diode and a grounding terminal.

In addition, the load current recycling circuit includes a charge current source connected in series between the condenser and the load and a consumption current source connected between an input terminal of the current source and a grounding terminal, and a current of the consumption current source is reduced if a current of the charge current source is increased, and the current of the consumption current source is increased if the current of the charge current source is reduced, so that the charge and consumption current sources interwork with each other like a seesaw in such a manner that a total current of the charge and consumption current sources is identical to the design current.

As described above, according to the LED lighting apparatus equipped with high-efficiency power, a current used when emitting a light is recycled and used to drive the controller. Accordingly, the power consumption required to generate the driving voltage of the controller can be reduced, so that the efficiency of the power supply can be increased. In addition, the voltage across both terminals of a current source to restrict a current flowing through the LED blocks is reduced, so that the power consumption of the current source is reduced to prevent heat from being emitted from the current source and to increase the reliability for the power supply.

BRIEF DESCRIPTION OF THE DRAWINGS

The above and other objects, features and other advantages of the present invention will be more clearly understood from the following detailed description when taken in conjunction with the accompanying drawings, in which:

FIG. 5 is a table showing a current-voltage characteristic of a light emitting block model according to the first embodiment of the present invention;

FIG. 7 is a table showing model currents according to voltage phases according to the first embodiment of the present invention;

FIG. 9 is a table showing the voltage across both terminals of a current source according to the second embodiment of the present invention.

DETAILED DESCRIPTION OF THE INVENTION

Hereinafter, exemplary embodiments of the present invention will be described in detail. In accompanying drawings, the same elements will be assigned with the same reference numbers. In addition, those skilled in the art should comprehend the terms or words used in the present specification and accompanying claims as meanings and concepts appropriate to the technical spirit of the present invention instead of dictionary meanings or general meanings. In addition, the known functions and configurations that make the subject matter of the present invention rather unclear will be omitted from the following description.

Embodiment 1

A first embodiment of the present invention relates to a high-efficiency LED lighting apparatus, capable of recycling a load current to charge a condenser, which supplies power a controller, with the load current by applying a surplus voltage, which is consumed in a current source of restricting the load current, to both terminals of the condenser.

Hereinafter, the first embodiment of the present invention will be described with reference to FIG. 2.

Figure 1:
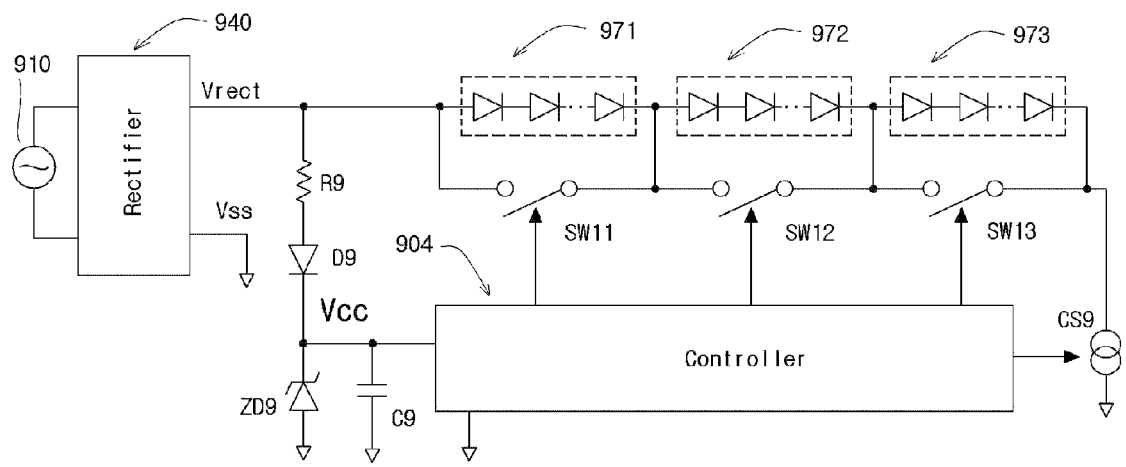
FIG. 1 is a circuit diagram showing an LED lighting apparatus according to the related art.
Figure 2:
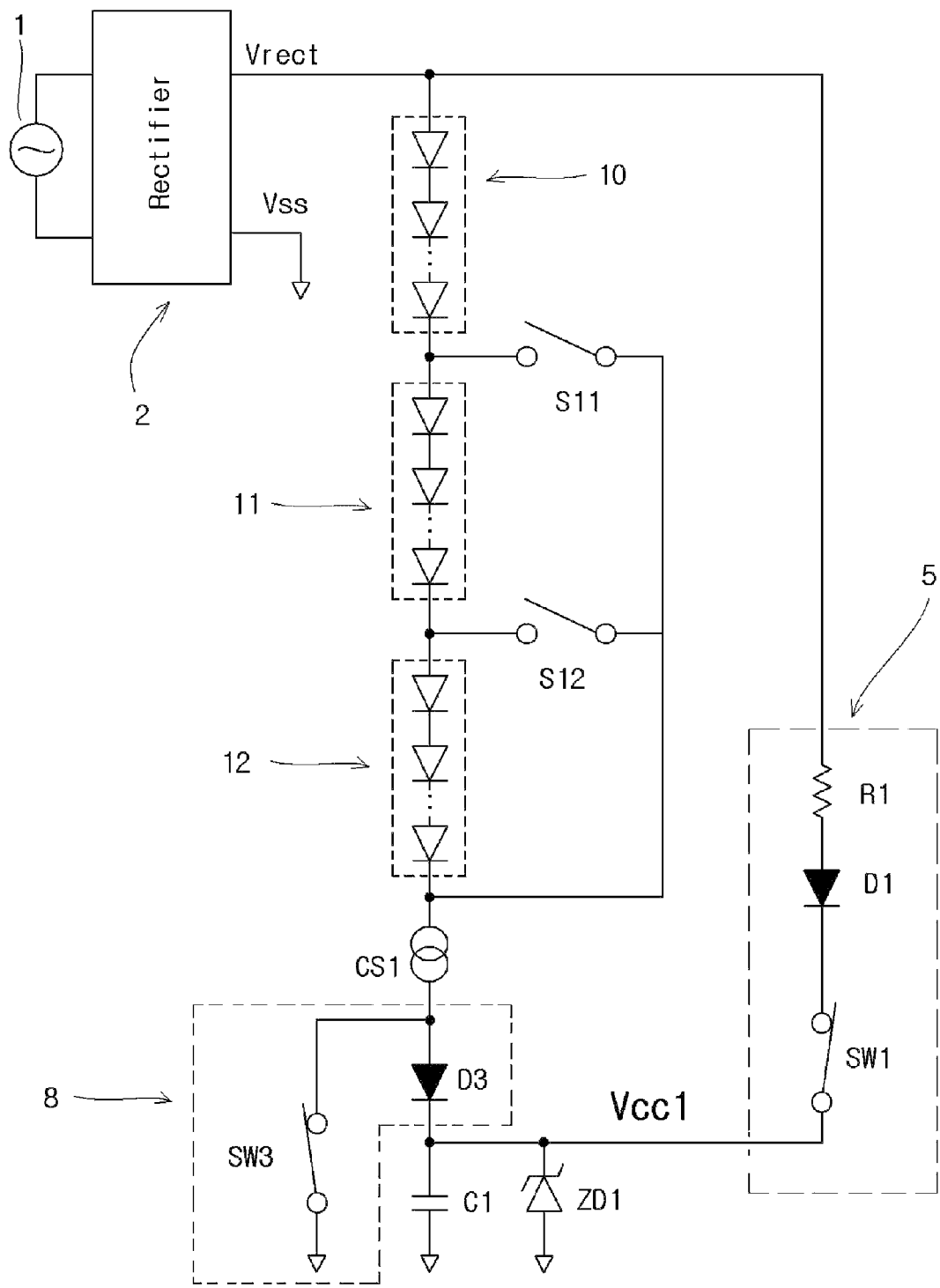
FIG. 2 is a circuit diagram showing an LED lighting apparatus according to a first embodiment of the present invention.

As shown in FIG. 2, an LED lighting apparatus according to the first embodiment of the present invention includes an AC voltage source 1 to supply an AC voltage, a rectifier 2 to convert the AC voltage received from the AC voltage source 1 into a DC rectified voltage Vrect, first to third LED blocks 10 to 12 that act as loads and are driven by a rectified voltage Vrect, which is an output of the rectifier 2, a switch block including first to third by-pass switches S11 and S12 arranged in parallel to by-pass the currents of the LED blocks 10 to 12, a current source CS1 to restrict the load current, and a controller (not shown) to control the switch block and a current source In addition, the LED lighting apparatus according to the first embodiment of the present invention includes a power supplying condenser C1 to supply DC power to the controller, and a resistor R1, a voltage source-side diode D1, a voltage source-side switch SW1, and a zener diode ZD1 for overvoltage protection that constitute a starting (charging) circuit 5 to charge the power supplying condenser C1.

In addition, preferably, the LED lighting apparatus according to the first embodiment of the present invention further includes a load-side switch SW3 and a load-side diode D3 that constitute a load current recycling charging circuit 8 to recycle the load current so that the power supplying condenser C1 can be charged with the load current.

In addition, in the LED lighting apparatus according to the first embodiment of the present invention, first to third light emitting blocks 10 to 12, a current source CS1, a diode D3, and a condenser C1 are sequentially connected to each other in series between the terminal of the rectified voltage Vrect and a grounding terminal Vss. The load-side switch SW3 of the load current recycling charging circuit 8 is interposed between an anode of the load-side diode D3 and the grounding terminal Vss.

In the starting (charging) circuit 5 of the LED lighting apparatus according to the first embodiment of the present invention, the resistor R1, the voltage source-side diode D1, the voltage source-side switch SW1, and the zener diode ZD1 for overvoltage protection are sequentially connected to each other in series and interposed between the terminal of the rectified voltage Vrect and the grounding terminal Vss. A cathode of the zener diode ZD1 is connected to a positive voltage terminal of the power supplying condenser C1.

In addition, each of the first to third light emitting blocks 10 to 12 may include at least one LED, or a plurality of LEDs arranged in series, in parallel, in series/parallel. The first to third light emitting blocks 10 to 12 can be configured through a technology generally well known in the art. Accordingly, the details thereof will be omitted in order to avoid redundancy.

Hereinafter, the operation of the circuit according to the present invention will be described.

<Before Supplying Commercial Voltage>

In the circuit of FIG. 2, since the power supplying condenser C1 is not charged before the Ac voltage source 1 starts to supply a commercial voltage, the operating voltage of the controller (not shown) is not generated. Accordingly, the default value of the switch block is preferably set to prevent an overvoltage from being supplied to the load when the supply of the commercial voltage is started in a state that the controller (not shown) is not operated.

In more detail, the initial states (cut off, normally open) of the first and second by-pass switches S11 and S12 to by-pass the currents of the LED light emitting blocks are set so that all currents flow through the loads, thereby maximizing the load threshold voltage. In addition, the switch (not show) connected to the load in series is cut off to prevent a current from flowing through the load until power is supplied to the controller (not shown) so that the controller has been normally operated.

<Initial Step of Commercial Power Supply Commencement>

If the AC voltage source 1 starts to supply a commercial voltage, the voltage source-side switch SW1 is preferably conducted (normally closed) so that the power supplying condenser C1 is charged by the starting (charging) circuit 5 to supply a DC voltage to the controller (not shown).

The switch SW3 of the load current recycling charging circuit 8 has no specific limitation in an initial state. However, when an amount of the load current is not accurately controlled, it is preferred that the load current is not recycled, but flowed to the grounding terminal Vss for the safety. In other words, it is preferred that the load-side switch SW3 is conducted (normally closed).

In addition, preferably, after a sufficient voltage (for example, Vcc1 is in the range of about 6V to about 50V) has been charged in the power supplying condenser C1, the controller (not shown) starts operating to control the switch block such that LED blocks suitable for the instantaneous rectified voltage Vrect are arranged in series, and to control the current source CS1 such that an amount of currents flowing through the load can be restricted.

<Operation of Load Current Recycling Charging Circuit>

The load current recycling charging circuit 8 is operated in a load current recycling mode or a load current consumed mode according to the state of the load-side switch SW3. In other words, when the load-side switch SW3 is conducted, so that the load current flows to the ground terminal Vss, the load current recycling charging circuit 8 is operated in the load current consumed mode. When the load-side switch SW3 is cut off, so that the load current is charged in the power supplying condenser C1 through the load-side diode D3, the load current recycling charging circuit 8 is operated in the load current recycling mode.

The controller (not shown) sets a load current by controlling the current source CS1, so that a small amount of load currents flows if the instantaneous rectified voltage Vrect represents a low value, and a great amount of load currents flows if the instantaneous rectified voltage Vrect represents a high value, thereby improving a power factor.

Hereinafter, the voltage across both terminals of the current source CS1 is referred to as "consumption mode current source voltage" when the load current recycling charging circuit 8 is operated in the load current consumed mode, and a voltage applied to the anode of the load-side diode D3 is referred to as "recycling mode DC charging voltage" when the load current recycling charging circuit 8 is operated in the load current recycling mode. In addition, in the load current recycling mode, the voltage across both terminals of the current source CS1 is referred to as "recycling mode current source voltage".

In this case, when the consumption mode current source voltage is higher than the recycling mode DC charging voltage, the load-side switch SW3 is cut off, so that the load current recycling charging circuit 8 is operated in the load current recycling mode.

The recycling mode current source voltage is expressed as following Equation 1. The load current is recycled, so that the power efficiency is increased, and the power consumption of the current source CS1 is reduced, so that heat emission can be reduced. Accordingly, the life span of the current source CS1 can be increased.

Recycling mode current source voltage=consumption mode current source voltage-recycling mode DC charging voltage      Equation 1

If the first and second switches S11 and S12 are switched corresponding to the rectified voltage Vrect at the rising time of the rectified voltage Vrect, the controller operates to conduct the load-side switch SW3 so that the mode of the load current recycling charging circuit 8 can be into the load current consumption mode.

This is because the voltage across both terminals of the current source CS1 after the switching has been performed is lower than the voltage across both terminals of the current source CS1 before the switching is performed, and the voltage across both terminals of the current source CS1 is approximately a current source saturation voltage.

Preferably, if the rectified voltage Vrect is continuously increased, so that the consumption mode current source voltage becomes higher than the recycling mode DC charging voltage [a voltage across both terminals of the condenser C1+conduction voltage of load-side diode D3], the controller (not shown) manipulates the load-side switch SW3 to set the mode of the load current recycling charging circuit 8 into the load current recycling mode.

In addition, if the first and second switches S11 and S12 are switched corresponding to the rectified voltage Vrect at the falling time of the rectified voltage Vrect, the controller allows the load-side switch SW3 to be turned on so that the load current consumption mode is reached. In addition, preferably, the controller determines the setting of the consumption current recycling mode after measuring the consumption mode current source voltage and the voltage of the power supplying condenser C1.

This is because the voltage across both terminals of the current source CS1 after switching is performed may be not greater than the recycling mode DC charging voltage even if the voltage across both terminals of the current source CS1 after the switching is formed is greater than the voltage (current source saturation voltage) across both terminals of the current source CS1 before the switching is performed.

In this case, preferably, the controller controls the current source CS1 so that the step waveform current is supplied to the load based on the instantaneous rectifier current. In addition, preferably, the controller controls the current source CS1 so that the step waveform current is supplied to the load based on the phase of the rectified voltage Vrect. The controller generates sinusoidal signals having the same phase as that of the AC voltage. In addition, preferably, the controller controls the current source to supply a current corresponding to the sinusoidal signal to the load.

In this case, the controller generates a sinusoidal wave having the same phase as that of the AC voltage. This is because an AC current supplied from the AC voltage source has the same phase as that of the AC voltage and has the form of a sinusoidal wave, so that the power factor can be improved. In addition, the current applied to the load is obtained by rectifying the AC current.

The scheme for supplying a step waveform current to the load based on the instantaneous rectified voltage, supplying a step waveform current based on the instantaneous rectified voltage phase, and supplying a required current to the load by a sinusoidal signal generator are disclosed in Korean Unexamined Patent Publication Nos. 10-2010-0129538 and 10-2011-0000013 and technologies generally well known in the art. Accordingly, the details thereof will be omitted for the purpose of explanation.

The LED lighting apparatus equipped with a high efficiency power supply according to the first embodiment of the present invention capable of recycling the load current into the driving current of the controller has been described in detail.

Embodiment 2

Hereinafter, a second embodiment according to the embodiment will be described with reference to FIGS. 2 to 9.

Figure 3:
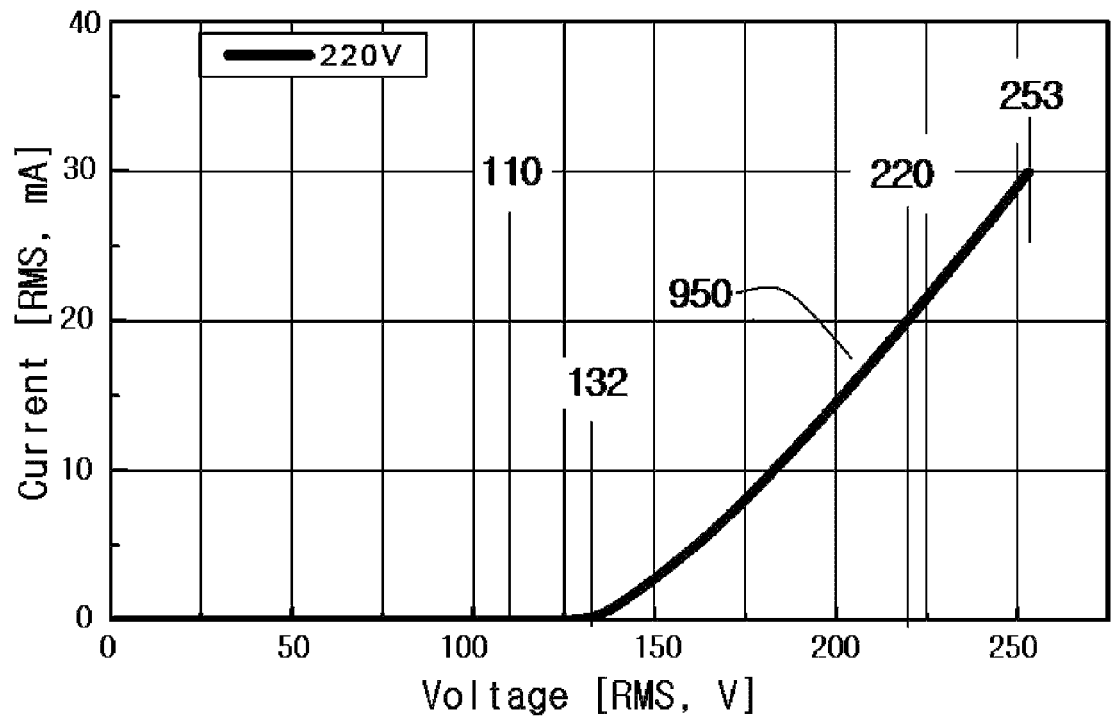
FIG. 3 is an LED current-voltage characteristic graph according to the first embodiment of the present invention.

According to the second embodiment of the present invention, an LED array having a current-voltage characteristic shown in FIG. 3 is partitioned into ten blocks to form individual sub-light emitting blocks, and a load, which is formed by connecting 11 sub-light emitting blocks to each other in series, is applied to the circuit of FIG. 2.

Although three light emitting blocks are shown in the circuit of FIG. 2, one light emitting block may be added to the three light emitting blocks as follows. An $(n+1)^{th}$ light emitting block is inserted between an output terminal of the last $n^{th}$ light emitting block and an input terminal of the current source CS1, and an additional $(n+1)^{th}$ by-pass switch is inserted between the input terminal of the $(n+1)^{th}$ light emitting block and the input terminal of the current source CS1. In this case, the switches are connected to each other in parallel, which is referred to as "parallel-connection switch block". At least two light emitting blocks may be provided, and the present invention has no limitation in the number of the light emitting blocks.

In addition, the controller (not shown) generates a sinusoidal signal having the same phase as that of the AC voltage, and, preferably, controls the current source CS1 to supply a required current having the form of a sinusoidal wave to the load.

A characteristic curve 950 of FIG. 3 represents a current-voltage characteristic curve of "AX3220" which is formed by arranging a plurality of LEDs in series by Seoul Semiconductor Co. A threshold voltage allowing a current to start to flow is about 132V. When a voltage becomes 220V, a current of 20 mA may flow.

Following table 1 represents voltages extracted from the current-voltage characteristic curve 950 of FIG. 3 when a current varies by 1 mA within the range of 0 mA to 30 mA.

TABLE 1

| Current | Voltage |
|---------|---------|
| 0.0 | 131.18 |
| 1.0 | 140.11 |
| 2.0 | 145.80 |
| 3.0 | 151.79 |
| 4.0 | 156.25 |
| 5.0 | 161.40 |
| 6.0 | 166.21 |
| 7.0 | 170.67 |
| 8.0 | 174.45 |
| 9.0 | 178.91 |
| 10.0 | 182.69 |
| 11.0 | 186.81 |
| 12.0 | 190.59 |
| 13.0 | 194.71 |
| 14.0 | 198.15 |
| 15.0 | 201.58 |
| 16.0 | 205.36 |
| 17.0 | 209.13 |
| 18.0 | 212.57 |
| 19.0 | 216.35 |
| 20.0 | 219.44 |
| 21.0 | 223.21 |
| 22.0 | 226.65 |
| 23.0 | 230.08 |
| 24.0 | 233.52 |
| 25.0 | 236.61 |
| 26.0 | 240.04 |
| 27.0 | 243.48 |
| 28.0 | 246.91 |
| 29.0 | 250.34 |
| 30.0 | 253.09 |

Figure 4:
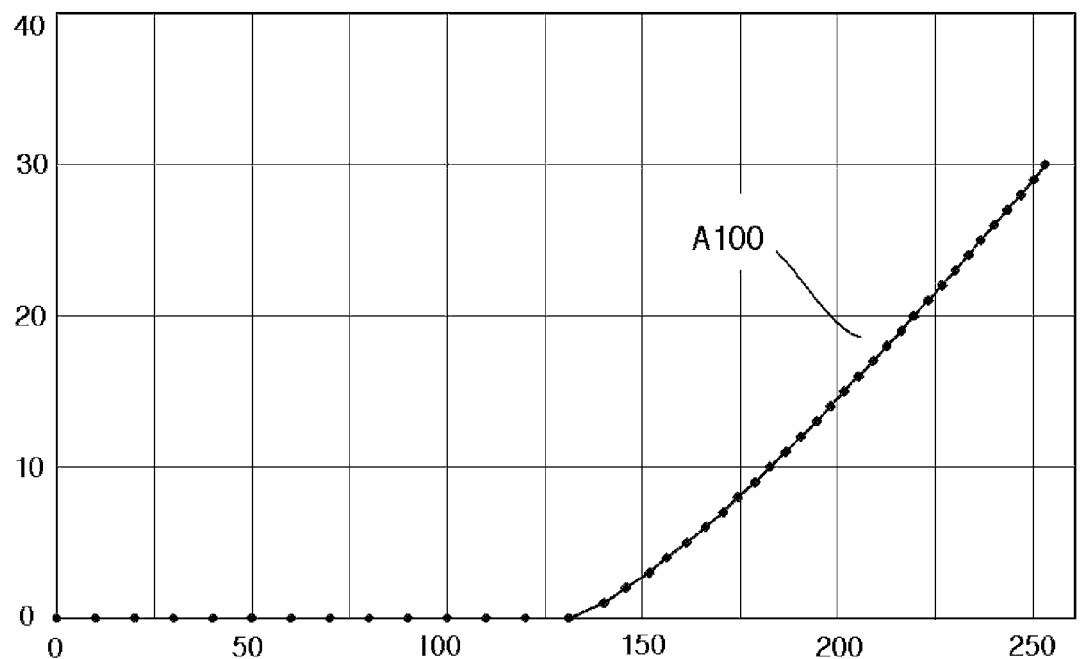
FIG. 4 is a current-voltage characteristic graph obtained by modeling FIG. 3.

If table 1 is represented in the form of a graph, a measurement model current curve A100 of FIG. 4 can be obtained. In this case, the horizontal axis represents a voltage (this voltage is expressed as a value obtained by dividing the instantaneous voltage by 1.414, and, hereinafter, a voltage will be expressed as a numerical value divided by 1.414 for the purpose of explanation unless specific mention), and the vertical axis represents a current. The units of the voltage and the current are V and mA, respectively.

LED light emitting blocks to be described later will be modeled based on table 1. First, according to one embodiment, a measurement model light emitting block is divided into 10 sub-light emitting blocks (in other words, first to tenth light emitting blocks). If one sub-light emitting block is modeled, the equivalent series resistance of the sub-light emitting block becomes 1/10 of the measurement model light emitting block.

Therefore, the voltage of the sub-light emitting block corresponding to each current shown in table 1 becomes 1/10 of the voltage of the measurement model. In addition, according to the same principle, the two sub-light emitting blocks are connected to each other in series, and the voltage of the sub-light emitting block corresponding to each current shown in table 1 becomes 2/10 of the voltage of the measurement model.

FIG. 5 shows one to eleven sub-light emitting blocks which act as loads and are connected to each other in series. As shown in FIG. 5, the first model M1 is obtained by modeling one sub-light emitting block, the second model M2 is obtained by modeling two sub-light emitting blocks connected to each other in series, and the third model M3 is obtained by modeling three sub-light emitting blocks connected to each other in series. In the same manner, the tenth model M10 is obtained by modeling 10 sub-light emitting blocks connected to each other in series. In this case, the tenth model M10 has the same characteristic as that of the measurement model. In addition, the eleventh model M11 is obtained by modeling 11 sub-light emitting blocks connected to each other in series.

Hereinafter, several specific values extracted from FIG. 5 will be described. In the tenth model M10 having the same characteristic as that of the measurement model light emitting block, when a current of about 30 mA flows, a voltage becomes 253.09V. Accordingly, in the first model M1, since the equivalent series resistance becomes 1/10 of that of the measurement model light emitting block, a voltage becomes 25.31V at the current of 30 mA. In the second model M2, since the equivalent series resistance becomes 2/10 of the measurement model light emitting block, a voltage becomes about 50.62V at the current of about 30 mA. Voltage values in remaining models are calculated through the same principle.

Figure 6:
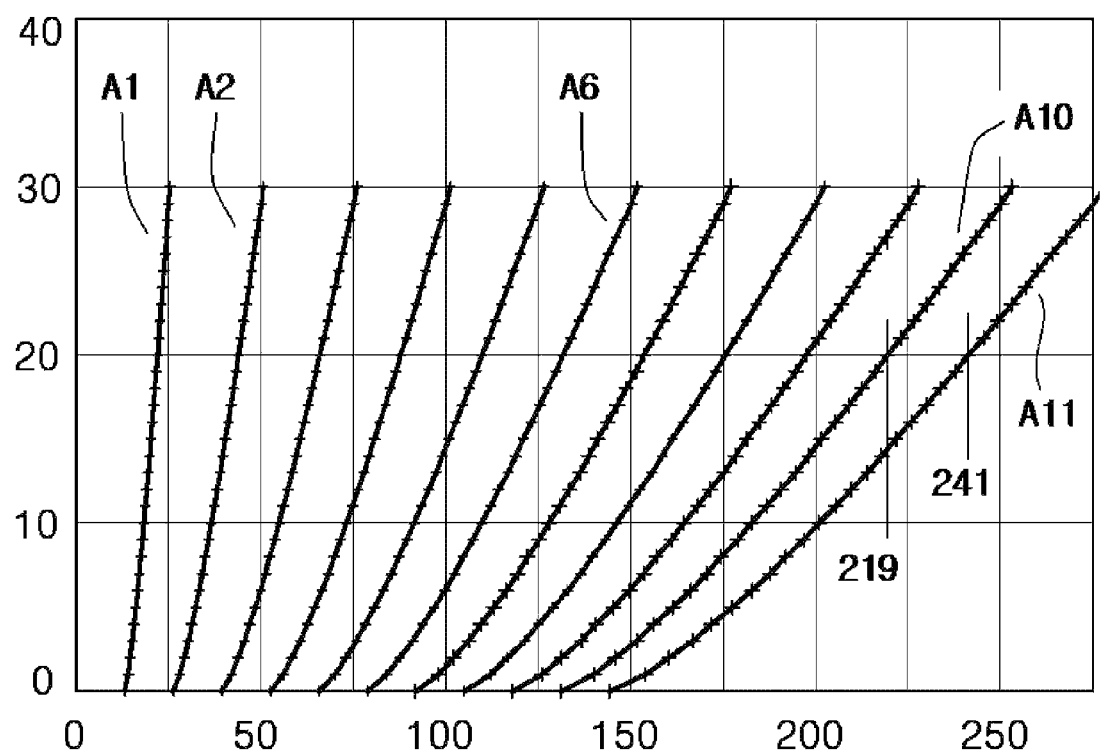
FIG. 6 is a current-voltage characteristic graph showing the light emitting block model according to the first embodiment of the present invention.

FIG. 6 is a graph showing current-voltage characteristics of the first model M1 to the eleventh model M11 based on the values of FIG. 5. In the graph of FIG. 6, the horizontal axis represents a voltage, and the vertical axis represents a current. The units of the voltage and the current are V and mA, respectively.

When the characteristic curve A1 of the first model M1 is compared with the characteristic curve A11 of the eleventh model M11, as the number of light emitting blocks connected to each other in series is reduced, a current value is sharply increased.

In addition, since a current can flow corresponding to the voltage of about 150V in all of sixth to eleventh models M6 and M11 when an input voltage is 150V, an amount of the currents varies according to the selected model, that is, the number of the light emitting blocks to be turned on.

FIG. 7 is a view showing a table representing phase angles of the voltages shown in table 5 when an input voltage is about 220V. In other words, FIG. 7 is a view showing the table representing current-voltage phases. In this case, a phase angle Ang1 represents a voltage phase of the first model M1, and a phase angle Ang2 represents a voltage phase of the second model M2. In addition, a phase angle Ang3 represents a voltage phase of the third model M3. In the same manner, a phase angle Ang11 represents the voltage phase of the eleventh model M11.

The phase angles Ang1 to Ang11 are calculated through Equations 2 and 3.

Instantaneous voltage V=sin(phase angle)×220   Equation 2

Phase angle=sin$^{-1}$(instantaneous voltage V/220)   Equation 3

Figure 8:
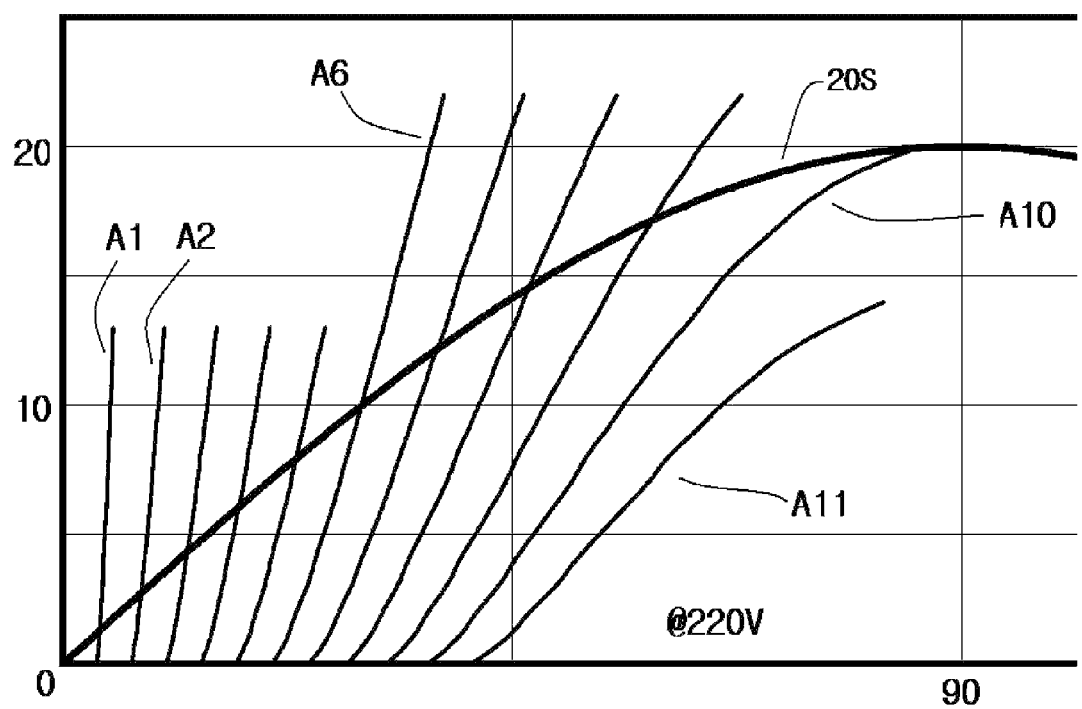
FIG. 8 is a graph showing model currents according to voltage phases according to the first embodiment of the present invention.

FIG. 8 is a graph representing model currents A1 to A11 of the first model M1 to the eleventh model current M11 according to input voltage phases of the input voltage having the peak value of 220V. In other words, FIG. 8 shows the current of each model according to each voltage phase of the input voltage having the peak value of 220V by using the table of FIG. 7. In the graph of FIG. 8, the horizontal axis represents a voltage phase, and the vertical axis represents a current. In addition, the units of the voltage phase and the current represent ° and mA, respectively.

Required current=sin(phase angle)×20 mA   Equation 4

Hereinafter, characteristics shown in FIG. 8 will be described.

The current curve A1 of the first model M1 approximates to a vertical line. In other words, even if a load current is "0" in the case of less than the threshold voltage of the first light emitting block 10, and a desired current flows through the load in the case of the threshold voltage or more, a current error may be neglected actually.

The current curve A6 of the sixth model M6 intersects with the desired current 20 S at the current of about 10 mA at the rising time of the rectified voltage Vrect. In this case, since the voltage across both terminals of the current source CS1 is minimized, the controller preferably controls the switch block so that six sub-light emitting blocks act as loads. The intersection between the model current and the desired current (i.e., design current) occurs at a time point which the switch block is controlled, so that the number of sub-light emitting blocks connected to each other in series is changed.

According to generalization expression, if the number of sub-light emitting blocks to be connected to each other in series are changed into N at the intersection between a predetermined n$^{th}$ model current and the desired current at the rising time of the rectified voltage Vrect, the voltage across both terminals of the current source CS1 is minimized (current source saturation voltage), and increased until an (n+1)$^{th}$ model current, which is a next model current, intersects with the desired current.

According to the second embodiment of the present invention, the measurement model is divided into 10 sub-light emitting blocks. However, if less than ten sub-light emitting blocks are provided, the voltage across both terminals of the current source CS1 is more increased.

Hereinafter, the voltage across both terminals of the current source CS1 will be described by using numerical values of FIG. 9.

In FIG. 9, "Angle" represents the phase of the rectified voltage within the range of 0° to 90°.

In addition, "Vin" represents an instantaneous rectified voltage, and has a value of 0 at the voltage phase of 0°, and a value of 220V at the voltage phase of 90°. The instantaneous rectified voltage Vin is calculated through Equation 2.

In addition, "I sin" represents a desired current, and has a value of 0 at the voltage phase of 0° and a value of about 20 mA at the voltage phase of 90°. The desired current I sin is calculated through Equation 2.

In addition, "Vcs" represents the voltage across both terminals of the current source CS1. The voltage Vcs is calculated through the following procedure, and the rectified voltage phase of 5° is taken into consideration.

Instantaneous voltage Vin is 19.2V.

Desired current I sin is 1.74 mA.

In FIG. 5, since the desired current I sin of 1.74 mA is not shown, each model voltage corresponding to a current of 2.0 mA higher than 1.74 mA is checked. The model voltage is 14.58V in the case of the first model M1, and 29.16V in the case of the second model M2.

In the case of the instantaneous rectified voltage Vin of about 19.2V, the first model M1 is driven, so that the desired current 1.74 mA [(M1) 14.58V] can be supplied. Accordingly, surplus voltage obtained by subtracting the voltage required to supply the desired current may be applied to both terminals of the current source CS1. Accordingly, the voltage across both terminals of the current source CS1 becomes 4.62V obtained by subtracting 14.58V from 19.2V.

However, since the desired current of 1.74 mA is supplied at the instantaneous rectified voltage of 29.16V in the case of the second model M2, the second model M2 cannot be driven by using the instantaneous rectified voltage of 19.2V supplied at the rectified voltage phase of 5°.

The voltage Vcs across both terminals of the current source CS1 is calculated by finding the maximum number of the light emitting models that can be driven at each voltage phase and calculating the difference between the instantaneous rectified voltage and the model voltage at the desired current. When the voltage phase is 5°, the voltage Vcs across both terminals of the current source calculated through step 1) to step 6) is marked as 4.6V in the table of FIG. 9.

FIG. 9 shows the voltages Vcs across both terminals of the current source, which are calculated with respect to the phases of 0° to 90°. In FIG. 9, the first model M1 is driven in the voltage phase range of 0° to 7°, and the second model M2 is driven in the voltage phase range of 8° to 12°.

In addition, the ninth model M9 is operated in the voltage phase range of 58° to 79°. In particular, regarding 69°, the voltage Vcs across both terminals of the current source is expressed as 10.7V, and 1.414 times 10.7V is 15.1V. In this case, the desired current is 18.67 mA. Further, regarding 79°, the voltage Vcs across both terminals of the current source is expressed as 18.5V, and 1.414 times 18.5V is 26.2V. In this case, the desired current is 19.63 mA.

In other words, if the voltage Vcs across both terminals of the current source has a value sufficient to charge the power supplying condenser C1, and the power supplying condenser C1 is charged by recycling a load current in the voltage phase range of 69° to 79°, the current of about 2 mA (18 mA×10°/90°) can be supplied to the controller.

As described above, according to the related art, the current required by the controller is 1 mA. However, even if only a current supplied in the voltage phase range between 69° and 79° is recycled, the current of about 2 mA is supplied to the controller. According to the related art, when the starting (charging) circuit 5 is used, the power consumption of 400 mW (200 Vrms×2 mA) occurs at the voltage source-side resistor R1. However, according to the present embodiment, if the load current is recycled, the power consumption of about 400 mW at the starting (charging) circuit 5 can be reduced. In other words, according to the present invention, high power efficiency can be represented even in a low-power LED lighting apparatus.

As described above, the LED lighting apparatus equipped with the high-efficiency power supply according to the second embodiment of the present invention recycling the load current into the driving current of the controller has been described.

Embodiment 3

Hereinafter, the third embodiment of the present invention will be described by using the circuit of FIG. 10.

Figure 10:
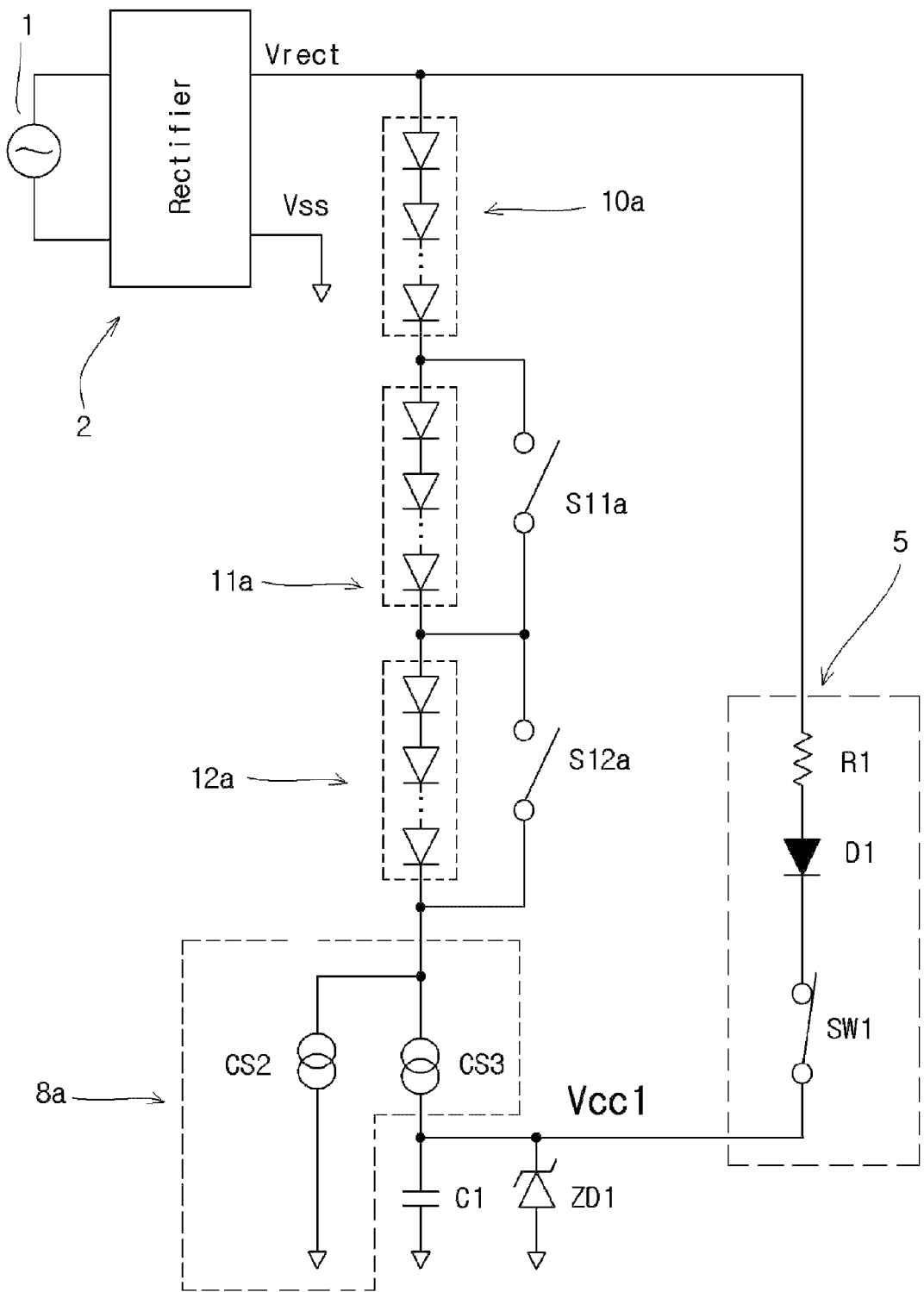
FIG. 10 is a circuit diagram showing an LED lighting apparatus according to a third embodiment of the present invention.

The circuit of FIG. 10 has the same structure as that of FIG. 2 except for the structure of a load current recycling charging circuit 8a and the arrangement of switches to by-pass a current flowing through the light emitting block acting as a load.

Hereinafter, for the purpose of explanation, the circuit of FIG. 10 will be described in detail while focusing on the difference between the circuits of FIGS. 10 and 2.

The circuit of FIG. 10 is first different from the circuit of FIG. 2 in that a load current recycling charging circuit 8a of FIG. 10 is different from the load current recycling charging circuit 8 of FIG. 2. In other words, the circuits of FIGS. 10 and 2 have the same purpose of improving power efficiency by recycling the load current, and have a difference in terms of realization methods.

In the circuit of FIG. 10, there are two current paths of passing through the load. One is a path (charge current path) of charging the power supplying condenser C1 through a charging current source CS3, and the other is a path to the grounding terminal Vss through a consumption current source CS2.

In this case, preferably, the charging current source CS3 interworks with the consumption current source CS2 like a seesaw. In other words, the controller performs a control operation so that the sum of currents from two current sources becomes a design current, by reducing an amount of a consumption current if an amount of a charging current is increased, and by increasing the amount of the consumption current if the amount of the charging current is reduced.

Preferably, the controller controls the charging current source CS3 and the consumption current source CS2 so that a step waveform current can be supplied to the load based on the instantaneous rectified voltage. In addition, preferably, the controller controls the charging current source CS3 and the consumption current source CS2 so that a step waveform current can be supplied to the load based on rectified voltage phases. In addition, the controller can generate a sinusoidal signal having the same phase as that of the AC voltage to control the charging current source CS3 and the consumption current source CS2 so that the current (hereinafter, referred to as desired current) corresponding to the sinusoidal signal can be supplied to the load.

Secondarily, the circuit of FIG. 10 is different from the circuit of FIG. 2 in that the circuit of FIG. 10 includes a switch block having series-connection. In more detail, a second light emitting block 11a is connected to a second switch S11a in parallel, and a third light emitting block 12a is connected to a third switch 512a in parallel. The second switch S11a is connected to the third switch 512a in series.

One light emitting block may be added to existing light emitting blocks, that is, three light emitting blocks may be increased to four light emitting blocks as follows. An additional $(n+1)^{th}$ light emitting block is connected to an additional $(n+1)^{th}$ switch in parallel, and then the $(n+1)^{th}$ light emitting block and the $(n+1)^{th}$ switch are inserted between an output terminal of the last $n^{th}$ light emitting block and an input terminal of the current source CS1. In this case, since the switches are arranged in series, the switches are referred to as "series-connection switch block". In this case, at least two light emitting blocks may be provided, and the present invention has no a specific limitation in the number of the light emitting blocks.

The operation of the circuit shown in FIG. 10 is identical to the operation of the circuit shown in FIG. 2 except for switch states. In other words, the circuits of FIGS. 2 and 10 have the same criterion related to the operation of the switch. Accordingly, the details thereof will be not made in the present specification for the purpose of explanation.

As described above, the LED lighting apparatus equipped with the high-efficiency power supply according to the third embodiment of the present invention recycling the load current to the driving current of the controller has been described in detail.

As described above, the embodiments of the present invention have been described in detail. The rectifier, a current source, a controller, and a switch, which have been described in detail according to the present invention, can be manufactured in the form of one semiconductor device.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An LED lighting apparatus comprising:
a rectifier to rectify an AC voltage so that the AC voltage is converted into a DC rectified voltage;
a load including a plurality of LED blocks connected to each other in series;
a switch block including switches to by-pass currents flowing through the LED blocks;
a current source to adjust a current supplied to the LED block;
a controller to calculate a design current value based on the AC voltage, regulate current flow of the load by controlling the switch block according to the design current value, and restrict an amount of currents flowing through the load by controlling the current source according to the design current value;
a power supplying condenser to supply charged power to the controller;
a starting circuit to charge the condenser if the rectifier starts to supply power; and
a load current recycling circuit to charge the condenser with a surplus voltage in such a manner that the controller is operated based on the surplus voltage remaining after the load uses the rectified voltage supplied thereto from the rectifier through a control of the controller for the switch block and the current source according to the design current value,
wherein the load current recycling circuit includes a load-side diode connected in series between the power supplying condenser and the load and a load-side switch connected between an anode of the load-side diode and a grounding terminal.

2. The LED lighting apparatus of claim 1, wherein the controller calculates the design current value as a sinusoidal wave by using a sinusoidal signal having a phase identical to a phase of the AC voltage.

3. The LED lighting apparatus of claim 1, wherein the controller controls the current source so that a step waveform current is supplied to the load based on a phase of one of an instantaneous rectified voltage and a rectified voltage.

4. The LED lighting apparatus of claim 1, wherein the switches of the switch block, which by-pass currents flowing through the LED blocks, are connected to each other in series or in parallel.

5. The LED lighting apparatus of claim 1, wherein the load current recycling circuit includes a charge current source connected in series between the condenser and the load and a consumption current source connected between an input terminal of the current source and a grounding terminal, and wherein a current of the consumption current source is reduced if a current of the charge current source is increased, and the current of the consumption current source is increased if the current of the charge current source is reduced, so that the charge and consumption current sources interwork with each other like a seesaw in such a manner that a total current of the charge and consumption current sources is identical to the design current.

* * * * *